United States Patent [19]

Oeder et al.

[11] 4,438,008
[45] Mar. 20, 1984

[54] LUBRICANT, CONTAINING ESTERIFIED ETHYLENE/ACRYLIC ACID OR ETHYLENE/MALEIC ACID COPOLYMERS AS THE ACTIVE INGREDIENT, FOR MOULDING CHLORINE-CONTAINING THERMOPLASTICS

[75] Inventors: Dieter Oeder, Weisenheim; Walter Ziegler, Edingen; Manfred Daeuble; Wolfram Dietsche, both of Frankenthal; Albert Hettche, Hessheim; Stefan Weiss, Neckargemuend, all of Fed. Rep. of Germany

[73] Assignee: BASF Aktiengesellschaft, Ludwigshafen, Fed. Rep. of Germany

[21] Appl. No.: 348,276

[22] Filed: Feb. 12, 1982

[30] Foreign Application Priority Data

Feb. 26, 1981 [DE] Fed. Rep. of Germany ....... 3107245

[51] Int. Cl.$^3$ .............................................. C10M 3/12
[52] U.S. Cl. ............................... 252/56 R; 525/330.1; 525/329.6; 525/384; 526/324
[58] Field of Search .................. 252/56 R; 525/330.1, 525/329.6, 384; 526/324

[56] References Cited

U.S. PATENT DOCUMENTS 2,850,469  9/1958  Christenson ...................... 526/324
3,089,897  5/1963  Balmer et al. .................... 252/56 R
3,981,850  9/1976  Wisotsky et al. ................. 252/56 R Primary Examiner—Jacqueline V. Howard
Attorney, Agent, or Firm—Oblon, Fisher, Spivak, McClelland & Maier

[57] ABSTRACT

A lubricant for molding chlorine-containing thermoplastics, which contains ethylene/acrylic acid or ethylene/maleic acid copolymers esterified, in a molar ratio of carboxyl groups to alcoholic hydroxyl groups of from 1:0.2 to 1:1, with $C_1$-$C_{20}$-aliphatic alcohols which may or may not contain ether groups, the copolymers, prior to esterification, having a mean molecular weight of from 500 to 10,000 and containing from 2 to 15% by weight of acrylic acid or from 1 to 8% by weight of maleic acid as copolymerized units, the percentages being based on copolymer.

6 Claims, No Drawings

LUBRICANT, CONTAINING ESTERIFIED ETHYLENE/ACRYLIC ACID OR ETHYLENE/MALEIC ACID COPOLYMERS AS THE ACTIVE INGREDIENT, FOR MOULDING CHLORINE-CONTAINING THERMOPLASTICS

The present invention relates to novel lubricants for molding chlorine-containing thermoplastics.

Chlorine-containing thermoplastics, of which the most important instance is polyvinyl chloride (for which reason the abbreviation PVC is used, in the text which follows, to represent all such materials) are molded, in conventional processing methods, at a high temperature and under pressure. Under these conditions, the hot plastic mass tends to stick to parts of the machine, and thereby becomes exposed to a longer residence time, which in turn causes thermal degradation of the material. Specifically when processing PVC, elimination of HCl may result. To avoid these difficulties, the plastic, which is generally in the form of a powder or granules, is mixed, before processing, not only with conventional stabilizers but also with lubricants which prevent it from sticking to the hot metal parts. Lubricants fall into two categories, namely internal and external lubricants. In the first category, fatty alcohols, glycerol fatty acid esters etc., paraffin hydrocarbons and low molecular weight polyethylene oxides have hitherto mostly been used.

A modern lubricant essentially has to meet 4 requirements.

1. A balanced ratio of internal lubricating action to external lubricating action is required, to ensure rapid and trouble-free processing and a smooth, pore-free surface of the finished article.

2. As already stated, the lubricant should at least retard the sticking of plastic to hot metal, and should be heat-stable.

3. Even as an external lubricant, it must be sufficiently compatible with the plastic for the finished articles to remain substantially transparent.

4. The lubricant should produce substantially no plating-out.

Overall, it is necessary that the plastic should be stable for at least 15 to 20 minutes when in contact with hot rolls. None of the prior art lubricants conform ideally to all these conditions simultaneously.

German Laid-Open Application DOS No. 2,727,329 discloses olefin/maleic acid ester copolymers, containing maleic acid ester and olefin as copolymerized units in the ratio of from 0.8:1 to 1.8:1; these are intended for use, with or without conventional lubricants, in processing, for example, PVC. However, it has been found that here again the heat stability and non-stick properties are unsatisfactory.

It is an object of the present invention to provide products which whilst having an equally advantageous external and internal lubricating action are heat-stable and adequately compatible with the plastic, and ensure good stability of the plastic on milling, and which also produce no plating-out or formation of deposits from the plastic mixture.

We have found that this object is achieved with the lubricants defined in the claims. These lubricants contain ethylene/acrylic acid or ethylene/maleic acid copolymers esterified, in a molar ratio of carboxyl groups to alcoholic hydroxyl groups of from 1:0.2 to 1:1, with $C_1$–$C_{20}$-aliphatic alcohols which may or may not contain ether groups, the copolymers, prior to esterification, having a mean molecular weight of from 500 to 10,000 and containing from 2 to 15% by weight of acrylic acid or from 1 to 8% by weight of maleic acid as copolymerized units, the percentages being based on copolymer.

Surprisingly, these lubricants are superior, in respect of heat stability and mill stability, to the esters of maleic acid/olefin copolymers described in German Laid-Open Application DOS No. 2,727,329.

The esterified ethylene/acrylic acid copolymers can be prepared in a simple manner, either by esterifying an ethylene/acrylic acid or ethylene/maleic acid copolymer which has been prepared in a conventional manner and has the required composition and molecular weight, with an alcohol of 1 to 20 carbon atoms or an alkoxylate thereof, or by copolymerizing an appropriate monomeric ester with ethylene in the required molar ratio, with or without monomeric acid in an amount which preserves the required esterification ratio.

The copolymerization itself can be effected in a conventional manner, with a free radical initiator, for example in emulsion in the presence of a regulator. Preferably, the copolymerization is carried out continuously, since the ratio of ethylene to acid is thereby easily kept constant.

A particularly advantageous method of copolymerization is proposed in our co-pending German Application P 30 44 519.3, which is herewith incorporated by reference.

In the said method, ethylene is copolymerized with the desired acid by a continuous process in the presence of a free radical initiator, at from 150° to 300° C. and under a pressure of from 1,000 to 3,000 bar, using a weight ratio of ethylene to acid of from 500:1 to 20:1, in a single-phase copolymerization medium in which the monomers are soluble, and in the presence of a regulator, such as propionaldehyde or n-butyraldehyde, from 3 to 25% by weight of the ethylene being employed at any one time and the copolymer formed being removed continuously from the reaction zone.

The copolymers thus obtained have melt indices of from 1,500 to 20 MFI units (measured at 160° C. under 325 g load), acid numbers of from 15 to 60 and Höppler hardnesses of from 200 to 800 bar (measured at 23° C. in accordance with DGF standard method M-III 9a (57)). The method of copolymerization described also gives the preferred molecular weight of from 1,000 to 2,000.

The subsequent esterification is carried out by a conventional method, using acid catalysis. A suitable alcohol for the esterification is any alcohol which conforms to the definition in the claim, though branched alcohols are preferred, and mixtures of such alcohols. Specific examples include methanol, ethanol, isopropanol, hydroxypropyl alcohol, n- and iso-butanol, 2-ethylhexanol, the isononal, isodecanol and isotridecanol obtained by oxo synthesis from diisobutene, tripropylene and tetrapropylene, $C_8/C_{10}$-, $C_{12}/C_{14}$- and $C_{16}/C_{18}$-Ziegler alcohols, $C_9/C_{11}$- and $C_{13}/C_{15}$-oxo-alcohols prepared from natural fatty acids, such as tallow alcohol, stearyl alcohol, cetyl alcohol, oleyl alcohol, lauryl alcohol, and mixtures of these.

The alcohols can also contain ether groups, examples of such alcohols being the monomethyl, monoethyl, monopropyl and monobutyl ethers of ethylene glycol, propylene glycol and 1,4-butylene glycol.

Moreover, the said alcohols can be oxyethylated, oxypropylated and/or oxybutylated, a suitable degree of oxyalkylation being from 1 to 20, preferably from 2 to 10. Preferred compounds are pure oxyethylation products, or mixed oxyethylation/oxypropylation products which contain the oxyalkyl groups either as a random mixture or in blocks.

The esterification products are clear, colorless materials having iodine color numbers of from 0 to 6, depending on the alcohol used for the esterification. They have a good Höppler hardness, of from 100 to 300 bar; their softening points are from 60° to 110° C., depending on the alcohol component and on the molecular weight. The products can readily be converted to a fine powder.

If the esterification component used is an oxyalkylated alcohol, the lubricant obtained exhibits very good non-stick properties even when used in very small amounts, ie. it permits a mill working time of from 60 to 80 minutes when used in amounts of from 0.3 to 0.5 phr (parts per 100 parts of resin), compared to only 20–30 minutes in the case of conventional lubricants, in particular including those of German Laid-Open Application DOS No. 2,727,329.

As stated, the polymeric esters, even used by themselves, act as excellent lubricants for chlorine-containing thermoplastics, such as PVC.

To modify the lubricant properties, the lubricants can contain from 10 to 90% by weight of hydrocarbons of >20 carbon atoms, preferably of 30 to 80 carbon atoms, esters of fatty acids of 10 to 30 carbon atoms, aliphatic alcohols of 12 to 30 carbon atoms and/or wax alcohols.

These materials, which were known as lubricants per se, provide the lubricants according to the present invention with an additional internal lubricant action and moreover do not discolor on prolonged exposure to heat, whilst they do discolor when used alone.

Finally, the lubricants, used alone or mixed with the above hydrocarbons, fatty acids or wax esters—may contain certain metal soaps, namely neutral and/or basic soaps of barium, calcium and/or lead, in amounts of from 1 to 5% by weight, based on the lubricant.

The lubricants can be employed in amounts of from 0.1 to 5 phr, the lower limit, preferably 0.3–0.5 phr, achievable when using esters of oxyalkylated alcohols being of particular importance.

The Examples which follow illustrate the invention.

In principle two methods of synthesis are possible. The first involves the preparation of an ethylene/acrylic acid or ethylene/maleic acid copolymer, which is subsequently completely or partially esterified; copolymers or terpolymers can be prepared by this method.

The second possibility is direct copolymerization or terpolymerization.

EXAMPLE 1

500 g of an acrylic acid/ethylene copolymer of acid number 47, 68 g of butyldiglycol and 0.55 g of dibutyltin oxide are heated for 10 hours at 180°–185° C., whilst excluding air and passing nitrogen through the reaction mixture. In the course thereof, a mixture of water and butyldiglycol distils off.

The reaction mixture which remains has an acid number of 26–27. It is poured out and allowed to cool, giving a solid white mass which melts at 101°–103° C. and can easily be pulverized.

Examples 2–10 are carried out by a similar method to that of Example 1. The different conditions of preparation and the product parameters are summarized in Table 1.

TABLE 1

| Example | Starting material (A) | Amount (A) | Esterification component (B) | Amount (B) | Amount and type of catalyst | Temperature and duration of esterification |
|---|---|---|---|---|---|---|
| 2 | ethylene/acrylic acid copolymer, acid number 45–46, molecular weight 2,050 | 750 g | iso-tridecanol | 80 g | 0.2 g concentrated H$_2$SO$_4$ | 140° C./6 h |
| 3 | ethylene/acrylic acid copolymer, acid number 45–46, molecular weight 2,050 | 250 g | adduct of iso-tridecanol + 7 EO | 99 g | 0.35 g DBTO | 180–185° C./10 h |
| 4 | ethylene/acrylic acid copolymer, acid number 45–46, molecular weight 2,050 | 500 g | adduct of tallow alcohol + 11 EO | 227.5 g | 0.7 g DBTO | 180–185° C./10 h |
| 5 | ethylene/acrylic acid copolymer, acid number 45–46, molecular weight 2,050 | 500 g | adduct of a C$_{13}$/C$_{15}$-oxo-alcohol + 11 EO | 174 g | 0.6 g DBTO | 180–185° C./10 h |
| 6 | ethylene/acrylic acid copolymer, acid number 45–46, molecular weight 2,050 | 800 g | mixture of 50% of n-octanol and 50% of n-decanol | 100 g | 0.9 g TBT | 180–185° C./10 h |
| 7 | ethylene/acrylic acid copolymer, acid number 45–46, molecular weight 2,050 | 500 g | tallow alcohol | 100 g | 0.6 g DBTO | 180–185° C./10 h |
| 8 | ethylene/acrylic acid copolymer, acid number 45–46, molecular weight 2,050 | 750 g | butyldiglycol | 75 g | 0.82 g DBTO | 180–185° C./10 h |

TABLE 1-continued

| Example | Starting material (A) | Amount (A) | Esterification component (B) | Amount (B) | Amount and type of catalyst | Temperature and duration of esterification |
|---|---|---|---|---|---|---|
| 9 | 2,050 ethylene/acrylic acid copolymer, acid number 45–46, molecular weight 2,050 | 750 g | ethyldiglycol | 85 g | 0.83 g DBTO | 180–185° C./10 h |
| 10 | ethylene/acrylic acid copolymer, acid number 45–46, molecular weight 2,050 | 150 g | butyltriglycol | 63.9 g | 0.2 g DBTO | 180–185° C./8 h |

DBTO = dibutyl-tin oxide
EO = ethylene oxide
TBT = tetrabutyl titanate

EXAMPLE 11

A mixture of 295 kg/h of ethylene, 2.6 kg/h of n-butyl acrylate and 1.94 kg/h of propionaldehyde (temperature of the mixture: 35° C.) is passed continuously through a 15 liter stirred autoclave kept under a pressure of 2,000 bar. The temperature in the autoclave is kept at 240° C. by continuous addition of 24.4 g/h of tert.-butyl perisononanate (TBIN). The polymer is obtained in an amount of 51.3 kg/h after letting down the reaction mixture; this corresponds to a conversion of 17.4%, based on ethylene throughput. The polymer contains 4.6% by weight of n-butyl acrylate as copolymerized units, and has a melt viscosity of 830 cSt, measured at 120° C.

The Höppler hardness of the product is greater than 200 bar, the melting point is 105°–107° C., and the iodine color number, measured after 30 minutes in a melt at 120° C., is 1–2.

Examples 12 to 15, given below, are carried out by a similar method of Example 11; the different conditions of preparation, and the product parameters, are summarized in Table 2.

Details are given in the Examples below.

EXAMPLE 17

The product whose preparation is described in Example 1 has an iodine color number of 2–3 (after 30 minutes exposure to 120° C.), a melting point of 101°–103° C., a molecular weight of about 2,500, and a residual acid number, after esterification, of 26–27. The Höppler hardness is about 250 bar, so that the product is pulverizable.

To test the compatibility with chlorine-containing thermoplastics, 0.6 phr of the lubricant was added to a mixture of 100 parts of suspension PVC, hereafter referred to as S-PVC (K value=65) and 1.5 parts of octyl sulfur tin stabilizer on a mill having co-rotating rolls of 20 cm diameter, both rolls rotating at the same speed; after working for 10 minutes at 160° C., 3 mm thick sheets were molded from the hide at 180° C. Measurement of the transparency of the sheets containing 0.6 phr of the product of Example 1 gives a value of 90%, based on PVC without lubricant, thus indicating good compatibility. Further results are shown in Table 3.

In addition to determining the iodine color number of

TABLE 2

| Example | Nature of co-monomer | Amount of co-monomer [% by weight] | Melt viscosity [cSt] | Pressure [bar] | Max. temp. [°C.] | Min. temp. [°C.] | Ethylene through-put [kg/h] | Co-monomer dosage rate [kg/h] | TBIN dosage rate [g/h] | PA dosage rate [g/h] | Output [kg/h] | Conversion [%] |
|---|---|---|---|---|---|---|---|---|---|---|---|---|
| 12 | AA/EDGA | 3.2/4.7 | 1,000 | 2,300 | 240 | 35 | 374 | 2.4/4.7 | 49.1 | 2.90 | 67.4 | 18.0 |
| 13 | MBM | 3.2 | 650 | 2,300 | 240 | 35 | 363 | 2.2 | 124.3 | 2.72 | 62.3 | 17.2 |
| 14 | HPA | 8.1 | 1,200 | 2,000 | 240 | 35 | 315 | 5.8 | 28.5 | 1.95 | 56.9 | 18.1 |
| 15 | LA | 9.6 | 900 | 2,000 | 240 | 35 | 308 | 6.6 | 30.8 | 2.27 | 56.6 | 18.4 |
| 16 | EHA | 9.0 | 840 | 2,000 | 240 | 35 | 302 | 5.8 | 12.3 | 2.29 | 55.2 | 18.3 | n-BA = n-butyl acrylate
AA = acrylic acid
EDGA = ethyldiglycol acrylate
MBM = monobutyl maleate
HPA = hydroxypropyl acrylate
LA = lauryl acrylate
EHA = ethylhexyl acrylate
PA = propionaldehyde
TBIN = tert.-butyl perisononanate The content of the EDGA comonomer in Example 12 was determined from the oxygen content.

In Examples 11, 14, 15 and 16, a degree of conversion of the comonomers of about 80–90% was assumed.

The lubricants prepared according to Examples 1–16 were tested for their suitability in various chlorine-containing thermoplastics, especially polyvinyl chloride. All the products exhibit a more or less pronounced external lubricant action.

the pure lubricant, the product is also subjected to a sustained milling test, in a tin-stabilized PVC formulation (100 parts of S-PVC, K value 65, +2.5 parts of octylsulfur-tin stabilizer). Product 1 (from Example 1) is employed in a concentration of 0.3 phr, and milling is effected at 180° C.; the mixture remains virtually colorless over 30 minutes' milling, and then begins to yellow and eventually to turn brown. In spite of the discoloration, the product shows no tendency to stick, up to a time of about 60–65 minutes.

To test for plating-out (exudation from the PVC mixture), the plates prepared for the above compatibility test are employed. They are left at 100% relative humidity for 200 hours, after which they are dried and tested for exudation by wiping with a finger or a cotton-wool pad.

Product 1 shows no exudation after 200 hours, even when used in an amount of 2 phr.

The effectiveness of the external lubricating action is tested by means of a Brabender plastograph, at various concentrations, in Ba/Cd-, Sn- and Pb-stabilized PVC formulations.

The Examples given in Table 3 relate to a Ba/Cd-stabilized PVC mixture of the following composition:
100 parts of S-PVC (K value 60)
2 parts of Ba/Cd stabilizer
0.5 part of co-stabilizer
0.5 part of glycerol monooleate.

Various amounts of the lubricants according to the invention are added to this base mixture, which is then introduced into the kneading chamber of the plastograph. The plastograph has the following data: contents 60 g, bath temperature 160° C., speed 40 rpm, load 5 kg.

Table 3 shows the maximum torque (kneading resistance) and plasticizing time for each mixture.

The Ba/Cd-stabilized base mixture (without lubricatant) has a maximum torque of 71 Nm; the plasticizing time is 45 s.

Product 1 reduces the torque at 0.8 phr to 50 Nm and increases the plasticizing time to 1.5 min. The product exhibits a pronounced external lubricating action.

The products of Examples 2–16 were tested under the same conditions. The results are shown in Table 3 below.

to 10,000 and containing from 2 to 15% by weight of acrylic acid or from 1 to 8% by weight of maleic acid as copolymerized units, the percentages being based on copolymer.

2. A lubricant as claimed in claim 1, wherein the copolymer is esterified with a branched alcohol.

3. A lubricant as claimed in claim 1 or 2, wherein the copolymer is esterified with an adduct of an alcohol with from 1 to 20 moles of ethylene oxide, propylene oxide and/or butylene oxide.

4. A lubricant as claimed in claim 1 or 2 or 3, which additionally contains from 10 to 90% by weight, based on the lubricant, of aliphatic hydrocarbons of >20 carbon atoms, esters of fatty acids of 10 to 30 carbon atoms with $C_{12}$–$C_{30}$-aliphatic alcohols and/or wax alcohols.

5. A lubricated chlorine-containing thermoplastic composition for molding purposes, comprising: a powdered or granulated chlorine-containing thermoplastic in admixture with 0.1 to 5 phr of an esterified ethylene/acrylic acid or ethylene/maleic acid copolymer, said copolymer being esterified, to the extent that the molar ratio of carboxyl groups to alcoholic hydroxyl groups ranges from 1:0.2 to 1:1, with a $C_1$–$C_{20}$ aliphatic alcohol which optionally contains ether groups, the copolymer, prior to esterification, having a mean molecular weight of from 500 to 10,000 and containing from 2 to 15% by weight of acrylic acid or from 1 to 8% by weight of maleic acid as copolymerized units, the percentages being based on said copolymer.

6. A method of lubricating chlorine-containing thermoplastics during a molding operation, comprising: mixing with a chlorine-containing thermoplastic from 0.1 to 5 phr of an esterified ethylene/acrylic acid or ethylene/maleic acid copolymer, said copolymer being esterified, to the extent of a molar ratio of carboxyl

TABLE 3

| Example | Iodine color number, 120°/0.5 h | Melting point (°C.) | Hoppler hardness (bar) | Acid number | Compatibility; % transparency (0.6 phr/3 mm) | Plastographic measurement (0.8 phr with Ba/Cd-stabilizer) | |
|---|---|---|---|---|---|---|---|
| | | | | | | maximum torque | gelling time |
| 2 | 2 | 105–107 | 250 | 22.1 | 84 | 54 Nm | 1.75 min |
| 3 | 2–3 | 85–100 | 100–150 | 28 | 86 | 55 Nm | 1.25 min |
| 4 | 3–4 | 85–103 | about 80–100 | 23 | 85 | 55 Nm | 1.25 min |
| 5 | 3 | 84–98 | 100–150 | 27.9 | 86 | 54 Nm | 1.25 min |
| 8 | 2 | 100–102 | 200–250 | 29.1 | 87 | 56.5 Nm | 1 min |
| 9 | 2 | 90–98 | 200 | 25 | 87 | 53 Nm | 1.25 min |
| 11 | 2–3 | 105–107 | 200–300 | 0 | 78 | 47 Nm | 3 min |
| 12 | 2 | 99–103 | 200–300 | 23 | 87 | 52 Nm | 1.75 min |
| 13 | 1–2 | 102–109 | 150–200 | 10.3 | 91.5 | 45 Nm | 2.75 min |
| 14 | 2–3 | 101–107 | 250 | 0 | 85.5 | 49 Nm | 1.9 min |
| 15 | 2 | 105–109 | 250–270 | 0 | 79 | 44 Nm | 4.5 min |
| 16 | 1–2 | 102–107 | 250 | 0 | 80 | 51 Nm | 2.25 min |
| formulation without lubricant | — | — | — | — | 98 | 71 Nm | 45 s |

We claim:

1. A lubricant for molding chlorine-containing thermoplastics and combined in an amount of 0.1 to 5 phr with said chlorine-containing thermoplastic, which contains ethylene/acrylic acid or ethylene/maleic acid copolymers esterified, in a molar ratio of carboxyl groups to alcoholic hydroxyl groups of from 1:0.2 to 1:1, with $C_1$–$C_{20}$-aliphatic alcohols which may or may not contain ether groups, the copolymers, prior to esterification, having a mean molecular weight of from 500 to 10,000 and containing from 2 to 15% by weight of acrylic acid or from 1 to 8% by weight of maleic acid as copolymerized units, the percentages being based on said copolymer; and molding said thermoplastic.

* * * * *